(12) United States Patent
Hayakawa et al.

(10) Patent No.: US 11,104,566 B2
(45) Date of Patent: Aug. 31, 2021

(54) METHOD OF REMOVING FOREIGN MATTER FROM PREFORM AND APPARATUS FOR REMOVING FOREIGN MATTER FROM PREFORM

(71) Applicant: Dai Nippon Printing Co., Ltd., Tokyo (JP)

(72) Inventors: Atsushi Hayakawa, Tokyo (JP); Manabu Harada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 92 days.

(21) Appl. No.: 15/527,117

(22) PCT Filed: Dec. 21, 2015

(86) PCT No.: PCT/JP2015/085646
§ 371 (c)(1),
(2) Date: May 16, 2017

(87) PCT Pub. No.: WO2016/104410
PCT Pub. Date: Jun. 30, 2016

(65) Prior Publication Data
US 2018/0009646 A1    Jan. 11, 2018

(30) Foreign Application Priority Data

Dec. 24, 2014 (JP) .............................. JP2014-259992

(51) Int. Cl.
*B67C 7/00* (2006.01)
*B29C 49/42* (2006.01)
(Continued)

(52) U.S. Cl.
CPC ............ *B67C 7/0006* (2013.01); *B08B 9/093* (2013.01); *B29C 49/42* (2013.01);
(Continued)

(58) Field of Classification Search
None
See application file for complete search history.

(56) References Cited

U.S. PATENT DOCUMENTS 3,575,713 A * 4/1971 Duff et al. ................ B08B 9/42
134/23
3,583,544 A * 6/1971 Prodzenski ............... B08B 9/30
198/404
(Continued)

FOREIGN PATENT DOCUMENTS

JP   2001-340821 A1   12/2001
JP   2008-074438 A1    4/2008
(Continued)

OTHER PUBLICATIONS

English Machine Translation of JP-2014083779.*
(Continued)

*Primary Examiner* — Mikhail Kornakov
*Assistant Examiner* — Pradhuman Parihar
(74) *Attorney, Agent, or Firm* — Burr & Brown, PLLC

(57) ABSTRACT

To facilitate removal of foreign matters from a preform. The preform in an inverted position with a mouth portion thereof facing down is being continuously transferred, filtered air is blasted into the preform through the mouth portion of the preform, and at the same time, air is sucked from the side of the mouth portion of the preform. Foreign matters can be more easily discharged from the preform because of the flow of air and the weight of the foreign matters.

6 Claims, 12 Drawing Sheets

(51) Int. Cl.
  *B29C 49/46*  (2006.01)
  *B08B 9/093* (2006.01)
  *B29K 67/00* (2006.01)
  *B29K 105/00* (2006.01)
  *B29L 31/00* (2006.01)

(52) U.S. Cl.
  CPC .......... *B29C 49/4252* (2013.01); *B29C 49/46* (2013.01); *B29C 2049/4682* (2013.01); *B29C 2049/4697* (2013.01); *B29K 2067/003* (2013.01); *B29K 2105/258* (2013.01); *B29L 2031/7158* (2013.01)

(56) References Cited

U.S. PATENT DOCUMENTS

| | | | | |
|---|---|---|---|---|
| 5,487,200 | A | * | 1/1996 | Herzog ............... B08B 5/00 15/1.51 |
| 5,881,429 | A | * | 3/1999 | Drewitz ............... B08B 5/02 15/304 |
| 9,321,621 | B2 | | 4/2016 | Kitano et al. |
| 2010/0229894 | A1 | * | 9/2010 | Nagatani ............... B08B 9/28 134/22.1 |
| 2013/0328248 | A1 | | 12/2013 | Herold et al. |
| 2014/0311095 | A1 | | 10/2014 | Hayakawa et al. |

FOREIGN PATENT DOCUMENTS

| | | | |
|---|---|---|---|
| JP | 2010-070239 A1 | 4/2010 | |
| JP | 2013-233979 A1 | 11/2013 | |
| JP | 2014-500169 A1 | 1/2014 | |
| JP | 2014-083779 A1 | 5/2014 | |
| JP | 2014083779 A * | 5/2014 | ............... B08B 5/02 |
| JP | 2014-231396 A1 | 12/2014 | |
| WO | 2011/148953 A1 | 12/2011 | |
| WO | 2013/061956 A1 | 5/2013 | |
| WO | WO-2013137321 A1 * | 9/2013 | ............... A61L 2/06 |

OTHER PUBLICATIONS

English Machine Translation of WO-2013137321.*
International Search Report and Written Opinion (Application No. PCT/JP2015/085646) dated Mar. 15, 2016.
Japanese Office Action (Application No. 2016-165018) dated Jun. 6, 2017 (with English translation).
Japanese Office Action (Application No. 2016-165021) dated Jun. 6, 2017 (with English translation).
Japanese Office Action (Application No. 2016-165022) dated May 23, 2017 (with English translation).

* cited by examiner

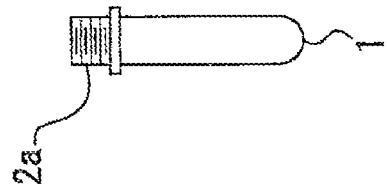
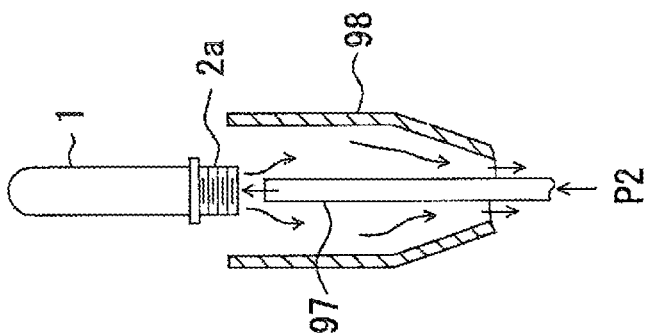
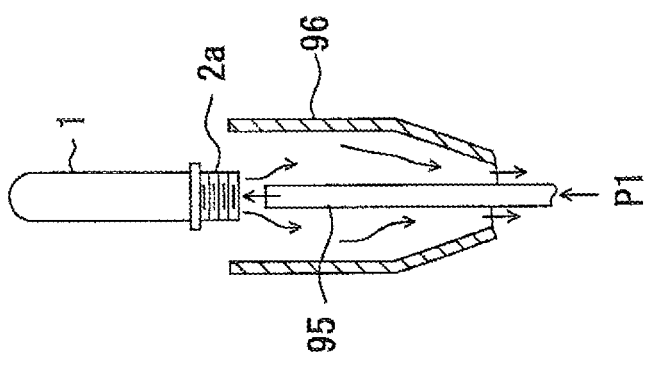

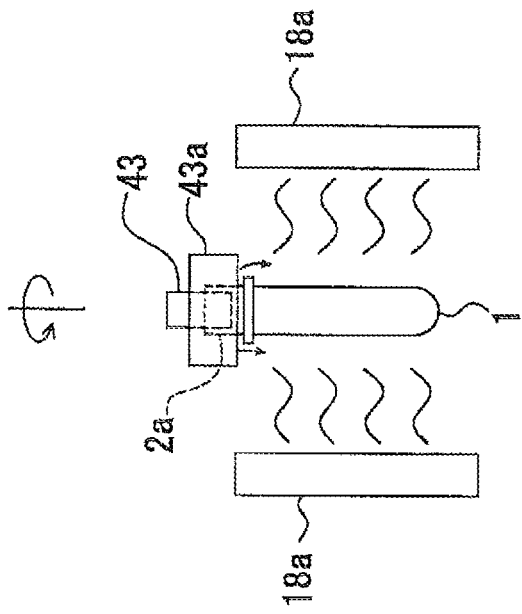
FIG.2(D) SUPPLY OF H2O2 GAS
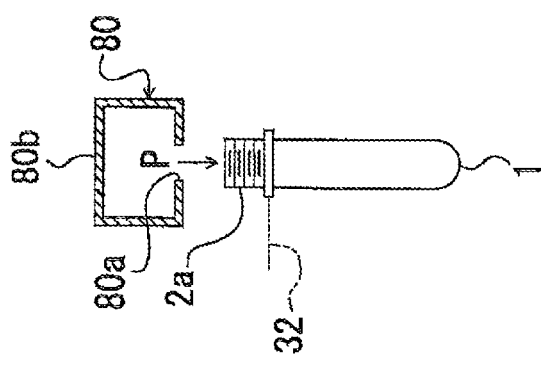
FIG.2(E) SUPPLY OF HOT AIR
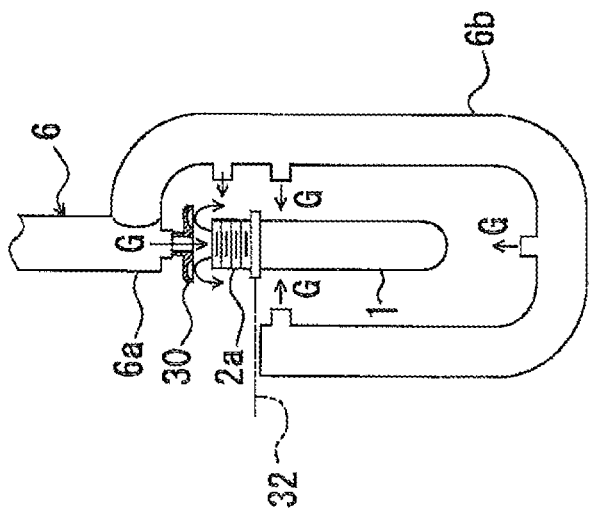
FIG.2(F) HEATING

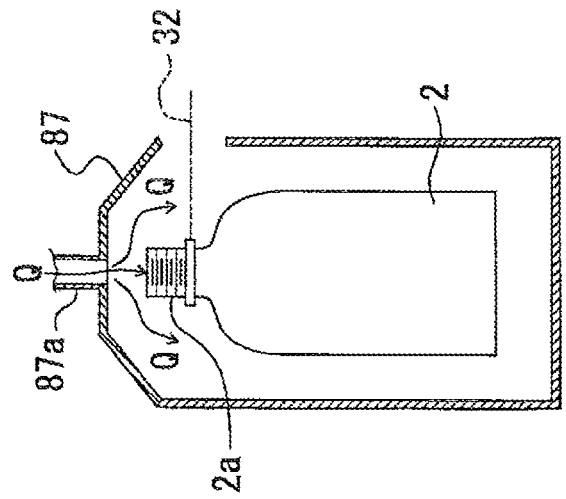
FIG.3(G) SUPPLY OF ASEPTIC AIR
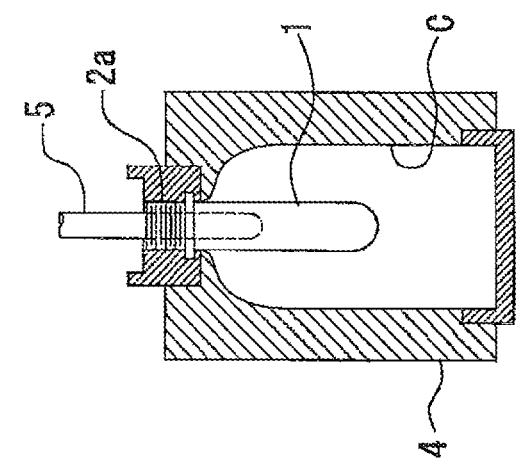
FIG.3(H) MOLDING
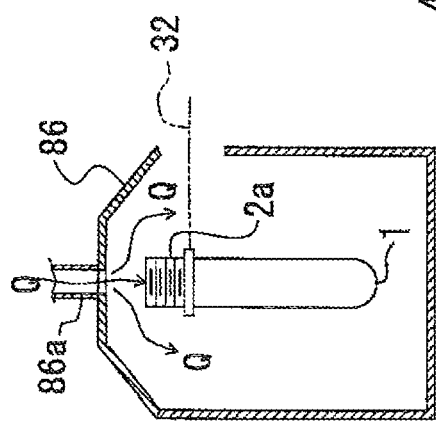
FIG.3(I) SUPPLY OF ASEPTIC AIR

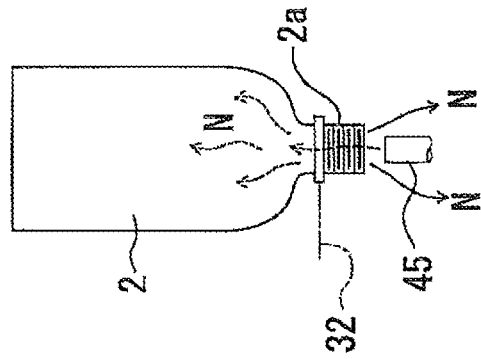
FIG.4(K2) AIR RINSING
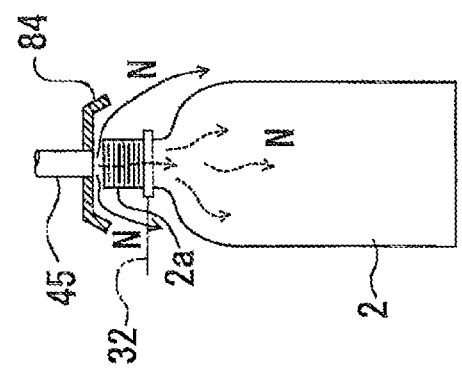
FIG.4(K1) AIR RINSING
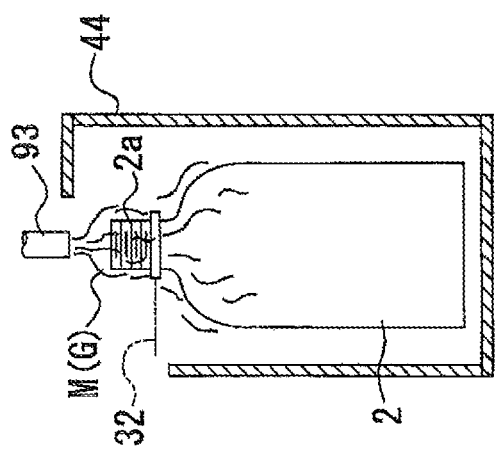
FIG.4(J) SPRAY OF HYDROGEN PEROXIDE FROM DIRECTLY ABOVE

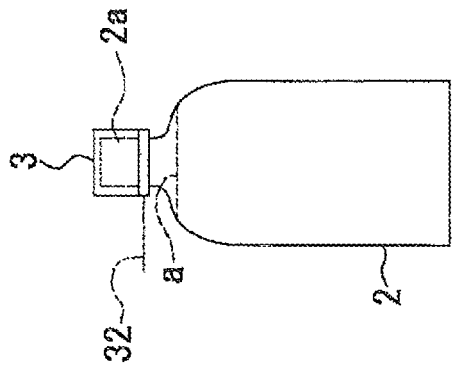
FIG.5(L) HOT WATER RINSING
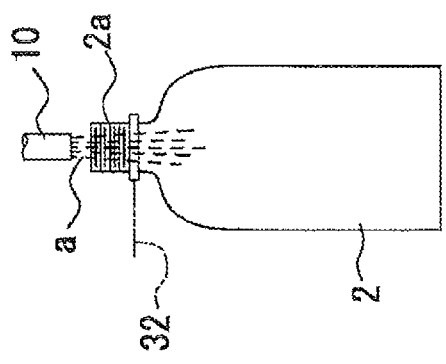
FIG.5(M) FILLING WITH CONTENT
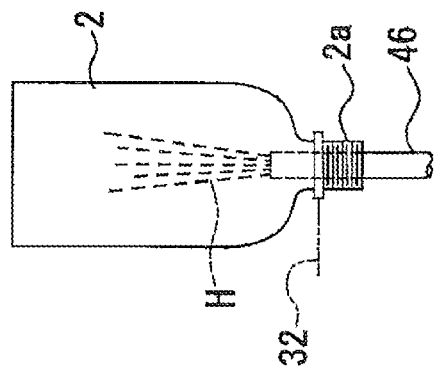
FIG.5(N) SEALING

METHOD OF REMOVING FOREIGN MATTER FROM PREFORM AND APPARATUS FOR REMOVING FOREIGN MATTER FROM PREFORM

BACKGROUND OF THE INVENTION

Field of the Invention

The present invention relates to a method of removing a foreign matter from a preform and an apparatus for removing a foreign matter from a preform.

Description of Related Art

If foreign matters such as dust remain in a preform, the foreign matters remain in a bottle molded from the preform. Furthermore, those foreign matters remain in the content of the bottle such as a drink after the bottle is filled with the drink and sealed. To avoid this, the foreign matters are desirably removed from the preform before the preform is molded into the bottle.

According to a conventional technique, foreign matters are removed from a preform by blasting air into the preform to blow foreign matters off the preform while the preform is conveyed in the upright position with the mouth portion thereof facing up. More specifically, a nozzle is arranged eccentrically with respect to the preform in the direction perpendicular to the direction of conveyance of the preform, and air is blasted into the preform from the nozzle so as to discharge foreign matters to the opposite side of the nozzle, thereby increasing the efficiency of collection of foreign matters from the exhaust duct (see Patent Document 1).

PRIOR ART DOCUMENT

Patent Document

Patent Document 1: Japanese Patent Laid-Open Publication No. 2014-83779

DISCLOSURE OF THE INVENTION

Problems to be Solved by the Invention

According to the conventional technique described above, in order to remove foreign matters from the preform, air is blasted into the preform with the mouth portion thereof facing up. Therefore, the foreign matters rising to above the mouth portion can fall into the preform again through the mouth portion.

In addition, the conventional technique has a problem that there is a need to adjust the aperture of the air nozzle in relation to the diameter of the mouth portion of the preform or adjust the position of the air nozzle in relation to the position of the mouth portion of the preform.

An object of the present invention is to solve the problems described above.

Means for Solving the Problems

To solve the problems described above, the present invention is configured as described below.

In the description, to facilitate understanding of the present invention, reference numerals are shown in parentheses. However, the present invention is not limited to the following description.

The invention according to a first aspect of the present invention adopts a method of removing a foreign matter from a preform, wherein, while a preform (1) in an inverted position with a mouth portion (2a) thereof facing down is being continuously transferred, filtered air is blasted into the preform (1) through the mouth portion (2a) of the preform (1), and at the same time, air is sucked from the side of the mouth portion (2a) of the preform (1).

According to a second aspect of the present invention, in the method of removing a foreign matter from a preform according to the first aspect of the present invention, the filtered air may be blasted into the preform (1) from a filtered air nozzle (97), and air may be sucked through a suction port member (98) arranged to surround the filtered air nozzle (97).

According to a third aspect of the present invention, in the method of removing a foreign matter from a preform according to the first aspect of the present invention, ionized air may be blasted into the preform (1) before the filtered air is blasted into the preform (1).

According to a fourth aspect of the present invention, in the method of removing a foreign matter from a preform according to the third aspect of the present invention, the ionized air may be blasted into the preform (1) from an ionized air nozzle (95), and air may be sucked through a suction port member (96) having a chute-like shape arranged to surround the ionized air nozzle (95).

The invention according to a fifth aspect of the present invention adopts an apparatus for removing a foreign matter from a preform, comprising a conveying device (99a, 99b, for example) that continuously transfers a preform (1) in an inverted position with a mouth portion (2a) thereof facing down, a filtered air nozzle (97) that blasts filtered air into the preform (1) being transferred, and a suction port member (98) having a chute-like shape that is arranged to surround the filtered air nozzle (97) and sucks air that flows out of the preform (1) being transferred.

According to a sixth aspect of the present invention, in the apparatus for removing a foreign matter from a preform according to the fifth aspect of the present invention, an ionized air nozzle (95) that blasts ionized air into the preform (1) being transferred in the inverted position may be arranged on an upstream side of the filtered air nozzle (97).

According to a seventh aspect of the present invention, in the apparatus for removing a foreign matter from a preform according to the sixth aspect of the present invention, a suction port member (96) having a chute-like shape may be arranged to surround the ionized air nozzle (95).

SUMMARY OF THE INVENTION

According to the method of removing a foreign matter from a preform according to the present invention, while a preform (1) in an inverted position with a mouth portion (2a) thereof facing down is being continuously transferred, filtered air is blasted into the preform (1) through the mouth portion (2a) of the preform (1), and at the same time, air is sucked from the side of the mouth portion (2a) of the preform (1). Thus, foreign matters such as dust or plastic pieces can be more easily discharged from the preform (1) because of the flow of air and the weight of the foreign matters. In addition, foreign matters having once been discharged from the preform (1) are less likely to enter the preform (1) again.

In addition, there is no need to adjust the aperture of the nozzle (95) or (97) in relation to the diameter of the mouth portion (2a) of the preform (1) or to adjust the position of the nozzle (95) or (97) in relation to the position of the mouth portion (2a) of the preform (1).

BRIEF DESCRIPTION OF THE DRAWINGS

FIG. 1 shows an aseptic filling method that adopts a method of removing a foreign matter from a preform according to the present invention, in which FIG. 1(A) show a step of supplying ionized air to a preform, FIG. 1(B) shows a step of supplying filtered air to the preform, and FIG. 1(C) shows a step of restoring the preform to an upright position.

FIG. 2(D) shows a step of supplying hydrogen peroxide to the preform, FIG. 2(E) shows a step of supplying hot air to the preform, and FIG. 2(F) shows a step of heating the preform.

FIG. 3(G) shows a step of supplying aseptic air to the preform, FIG. 3(H) shows a step of molding the preform into a bottle, and FIG. 3(I) shows a step of supplying aseptic air to the bottle.

FIG. 4(J) shows a step of supplying hydrogen peroxide to the bottle, and FIGS. 4(K1) and (K2) each show an air rinsing step following the step of supplying hydrogen peroxide.

FIG. 5(L) shows a hot water rinsing step after the step of supplying hydrogen peroxide, FIG. 5(M) shows a step of filling the bottle with a content, and FIG. 5(N) shows a sealing step.

FIG. 10 shows an air nozzle, in which

DETAILED DESCRIPTION OF THE INVENTION

Figure 6:
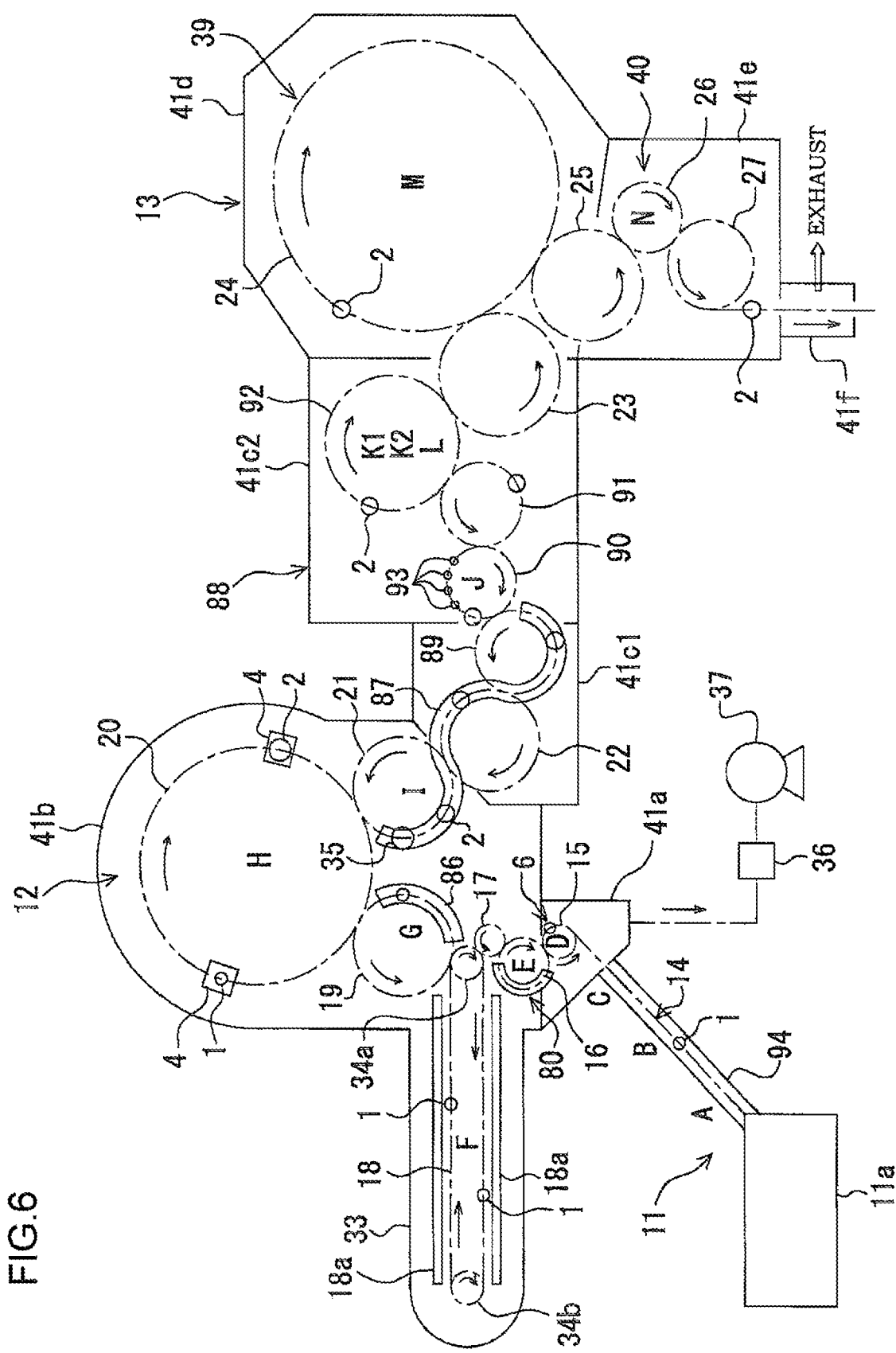
FIG. 6 is a plan view showing an example of an aseptic filling apparatus incorporating an apparatus for removing a foreign matter from a preform.

In the following, an embodiment of the present invention will be described.

According to this embodiment, an aseptic package (see FIG. 5(N)) as a final product is manufactured through various steps including cleaning of a preform 1 (see FIG. 1(A)), molding of a bottle 2 (see FIG. 3(I)), filling of the bottle 2 with a content such as a drink "a", and sealing of the bottle 2 with a lid such as a cap 3 (see FIG. 5(N)).

In this embodiment, the preform 1 and the bottle 2 are made of PET (polyethylene terephthalate). However, the material of the preform 1 and the bottle 2 is not limited to PET, and other resins such as polyethylene can also be used. Furthermore, a resin blended with recycled PET can also be used. A male thread is formed on a mouth portion 2a of the bottle 2.

The cap 3 is formed from a resin such as polypropylene by injection molding or the like, and a female thread is formed in an inner surface of the cap 3 while the cap 3 is molded.

After the interior of the bottle 2 is sterilized, the bottle 2 is filled with a sterilized drink "a" (see FIG. 5(M)) as a content. After the bottle 2 is filled with the drink "a", the cap 3 is placed on the mouth portion 2a of the bottle 2, the mouth portion 2a of the bottle 2 is sealed by engagement of the male and female threads, thereby completing the aseptic package. The cap 3 is also sterilized in advance.

As described later, the aseptic package is formed from the preform 1 through steps of supplying the preform 1, cleaning the preform 1, molding the preform 1 into the bottle 2, sterilizing the bottle 2, filling the bottle 2 with the drink "a", and sealing the bottle 2, for example.

The preform 1 with the mouth portion 2a facing up is continuously conveyed at a desired speed. During the conveyance, the preform 1 is inverted so that the mouth portion 2a faces down as shown in FIG. 1(A).

The preform 1 is a bottomed tubular body similar to a test tube that is previously formed from PET by injection molding or the like. The mouth portion 2a similar to that of the bottle 2 shown in FIG. 3(I) is formed on the preform 1 in an early stage of the molding of the preform 1. The male thread is formed on the mouth portion 2a while the preform 1 is molded.

As shown in FIG. 1(A), ionized air P1 is blasted into the preform 1 being conveyed in the inverted position through the mouth portion 2a of the preform 1. This removes static electricity from the interior of the preform 1 to make foreign matters such as dust or plastic pieces that can exist in the preform 1 more easy to fall out of the preform 1.

The ionized air P1 is blasted into the preform 1 from an ionized air nozzle 95, for example. One or more ionized air nozzles 95 are desirably arranged in such a manner that a nozzle opening thereof is disposed directly below the trajectory of the center of the mouth portion 2a of the preform 1.

While the ionized air P1 is being blasted into the preform 1, the air P1 is sucked from the side of the mouth portion 2a of the preform 1 facing down. Thus, foreign matters falling out of the preform 1 through the mouth portion 2a thereof are collected to a predetermined site by the flow of the air P1.

The suction of the air P1 is achieved through an opening of a suction port member 96 having a chute-like shape arranged to surround the ionized air nozzle 95.

After that, as shown in FIG. 1(B), a filtered air P2 is blasted into the preform 1 being conveyed in the inverted position through the mouth portion 2a thereof. As a result, foreign matters are discharged from the interior of the preform 1 along with the air P2.

The filtered air P2 is blasted into the preform 1 from a filtered air nozzle 97. One or more filtered air nozzles 97 are desirably arranged in such a manner that a nozzle opening thereof is disposed directly below the trajectory of the center of the mouth portion 2a of the preform 1. Alternatively, one or more filtered air nozzles 97 may be arranged in such a manner that the nozzle opening thereof is disposed directly below the trajectory of an eccentric point within the diameter of the mouth portion 2a of the preform 1 that is shifted outward from the center of the mouth portion 2a of the preform 1 being transferred.

The filtered air nozzle 97 desirably has an inner diameter of 3 mm 6 mm, and the distance between the nozzle opening and the preform 1 is desirably equal to or less than 10 mm and more desirably equal to or less than 5 mm.

While the filtered air P2 is blasted into the preform 1, the air P2 is sucked from the side of the mouth portion 2a of the preform 1 facing down. Thus, foreign matters are discharged from the mouth portion 2a of the preform 1 along with the air P2 and collected at the predetermined site together with the foreign matters having fell out of the preform 1 while the ionized air P1 was blasted.

The suction of the air P2 is achieved through an opening of a suction port member 98 having a chute-like shape arranged to surround the filtered air nozzle 97.

The preform 1 whose interior has been cleaned is then restored to the upright position from the inverted position as shown in FIG. 1(C).

The preform 1 restored to the upright position is held and conveyed by a gripper 32. During the conveyance, a gas G or mist N of a sterilizer or a mixture thereof is supplied.

The supply of the gas G or mist N of the sterilizer or a mixture thereof is achieved by injection thereof from a sterilizer supplying nozzle 6.

In this embodiment, hydrogen peroxide is used as the sterilizer. However, other sterilizers can also be used.

The hydrogen peroxide gas G flows in two conduits 6a and 6b of the sterilizer supplying nozzle 6 and is injected into the preform 1 from one of the conduits and injected to the outer surface of the preform 1 from the other conduit. Once the hydrogen peroxide gas G exits the sterilizer supplying nozzle 6, the hydrogen peroxide flows into the preform 1 or comes into contact with the outer surface of the preform 1 in the form of gas or mist or a mixture thereof.

The flow of the gas G injected into the preform 1 is covered with an umbrella-shaped member 30. The gas G or mist having flowed into the preform 1 then spills out of the mouth portion 2a of the preform 1, and the flow of the gas G or the like having spilled out collides with the umbrella-shaped member 30 and is guided by the inner surface of the umbrella-shaped member 30 toward the outer surface of the preform 1 to come into contact with the outer surface of the preform 1.

Since the gas G or mist of hydrogen peroxide or a mixture thereof comes into contact with and is deposited on the inner and outer surfaces of the preform 1, bacteria on the surfaces of the preform 1 is killed or damaged.

The hydrogen peroxide gas G blasted to the preform 1 is generated by a sterilizer gas generator 7 described later with reference to FIG. 9. The hydrogen peroxide gas G flows out of the sterilizer supplying nozzle 6 and comes into contact with the inner and outer surfaces of the preform 1, and a condensed film of hydrogen peroxide with a concentration of 35 percent by mass is deposited desirably in an amount of 0.001 µL/cm$^2$ to 0.5 µL/cm$^2$.

If the amount of deposition is smaller than 0.001 µL/cm$^2$, an adequate sterilization effect cannot be achieved. On the other hand, if the amount of deposition is greater than 0.5 µL/cm$^2$, defective molding such as bleaching, spotting, wrinkle or deformation is likely to occur on the bottle 2 blow-molded from the preform 1 as shown in FIG. 3(I) described later.

The amount of deposition of the condensed film of hydrogen peroxide with a concentration of 35 percent by mass on the preform 1 desirably ranges from 0.002 µL/cm$^2$ to 0.4 µL/cm$^2$.

When the hydrogen peroxide gas G is supplied to the preform 1 to deposit the condensed film on the surface of the preform 1 as described above, the hydrogen peroxide is quickly condensed and increased in concentration on the surface of the preform 1, and the effect of sterilization of the surface of the preform 1 is improved. As a result, the amount of hydrogen peroxide used for sterilization can be reduced, and the amount of the hydrogen peroxide remaining on the preform 1 decreases.

Immediately before the blasting of the hydrogen peroxide gas G to the preform 1 shown in FIG. 2(D), the preform may be preliminarily heated by blasting heated air to the preform 1, for example. The preliminary heating can further increase the effect of sterilization of the preform.

Instead of one sterilizer supplying nozzle 6, a plurality of sterilizer supplying nozzles 6 may be arranged along the transfer path of the preform 1, and the sterilizer gas may be discharged from the sterilizer supplying nozzles 6 to the preform 1.

The preform 1 to which hydrogen peroxide has been supplied is supplied with hot air P from an air nozzle 80 while being conveyed by the gripper 32 as shown in FIG. 2(E). The supply of the hot air P can be achieved using various nozzles such as a pipe-shaped nozzle, rather than the air nozzle 80 shown in the drawing.

The heat of the blasted hot air P activates the hydrogen peroxide deposited on the surface of the preform 1, and the activated hydrogen peroxide kills bacteria in the preform 1. In addition, the blasted hot air P quickly removes the hydrogen peroxide from the surface of the preform 1.

As shown in FIG. 2(F), the sterilized preform 1 is heated to a temperature suitable for the subsequent blow molding by an infrared heater 18a or other heating device. The temperature is approximately between 90° C. and 130° C. To prevent deformation or the like, the mouth portion 2a of the preform 1 passes through a position where the mouth portion 2a is not directly opposed to the infrared heater 18a and thus, the heat from the infrared heater 18a is not transferred to the mouth portion 2a. The temperature of the mouth portion 2a of the preform 1 is maintained to be equal to or lower than 70° C. to prevent deformation or the like.

In the heating, the preform 1 is released from the gripper 32 and is desirably conveyed by being suspended in the upright position from a spindle 43 inserted into the mouth portion 2a thereof and rotating with the spindle 43 as shown in FIG. 2(F). Thus, the preform 1 is uniformly heated by the infrared heater 18a.

Figure 11:
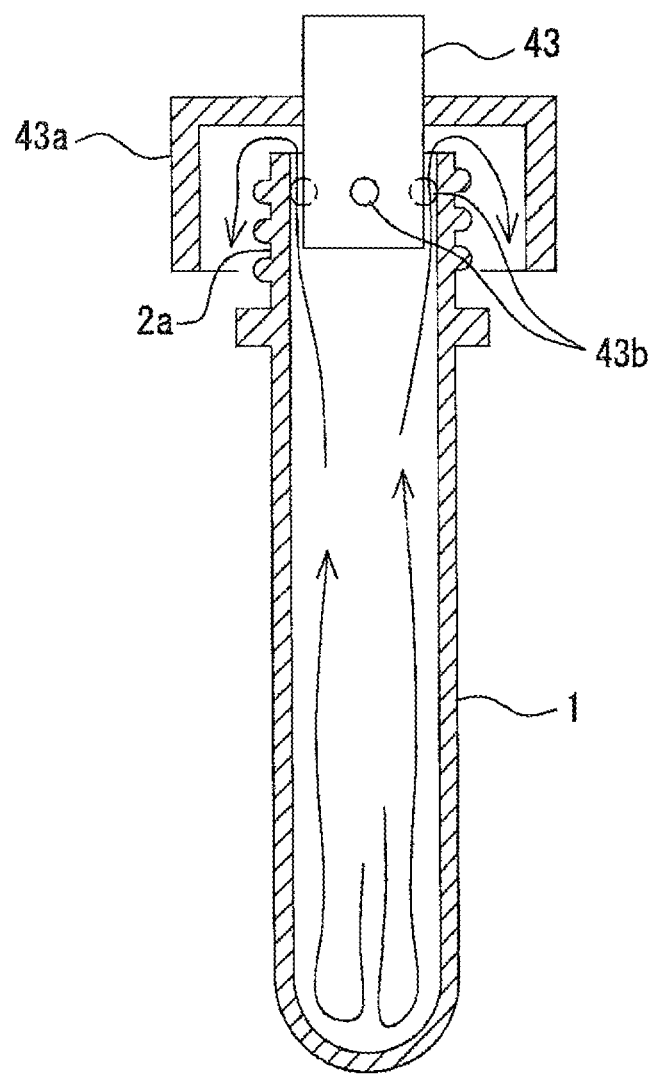
FIG. 11 is a vertical cross-sectional view of a nozzle that blasts hot air into the preform in FIG. 2(F).

As shown in FIG. 11, a plurality of ball-shaped elastic bodies 43b are embedded in a lower part of the spindle 43. Furthermore, an umbrella-shaped member 43a is attached to the outside of the spindle 43, as required.

Once the lower part of the spindle 43 is inserted into the mouth portion 2a of the preform 1, the elastic bodies 43b are elastically deformed to hold the preform 1 on the spindle 43. When there is the umbrella-shaped member 43a, the mouth portion 2a of the preform 1 is covered with the umbrella-shaped member 43a.

As shown in FIG. 11, when there is the umbrella-shaped member 43a, a gap is formed between the inner surface of the mouth portion 2a of the preform 1 and the lower part of the spindle 43 and between the outer surface of the mouth portion 2a of the preform 1 and the umbrella-shaped member 43a. Thus, when air in the preform 1 is heated by the heat from the infrared heater 18a, hot air flows out of the preform 1 through the gap and heats the mouth portion 2a of the preform 1.

To avoid compromising the sealing of the bottle 2 when the bottle 2 is subsequently sealed with a cap 3, attention should be paid not to cause deformation of the mouth portion 2a of the preform 1 when heat is applied to the preform 1.

The hot air flowing through the gap described above heats the mouth portion 2a only to a temperature equal to or lower than 70° C. at which the mouth portion 2a is not deformed. Such heating of the mouth portion 2a activates the minute amount of hydrogen peroxide remaining in the preform 1, which sterilizes the mouth portion 2*a* to an appropriate extent.

In the heating described above, the preform 1 is being conveyed by being suspended in the upright position from the spindle 43 inserted into the mouth portion 2*a* thereof and rotating on its axis with the spindle 43. As a result, the preform 1 excluding the mouth portion 2*a* thereof is uniformly heated by the infrared heater 18*a* to a temperature approximately from 90° C. to 130° C.

If a mandrel (not shown) is inserted into the preform 1 instead of the spindle 43, the preform 1 can be rotated and conveyed in the inverted position.

As shown in FIG. 3(G), the heated preform 1 is released from the spindle 43 and passed to the gripper 32, and aseptic air Q is blasted to the preform 1 at the side of the mouth portion 2*a* while the preform 1 is conveyed to a die 4 shown in FIG. 3(H), which is a blow molding die. The blasting of the aseptic air Q maintains the aseptic condition of the preform 1 while the preform 1 is supplied to the die 4.

The aseptic air Q may be replaced with hot air. Blasting of hot air prevents the temperature of the preform 1 from decreasing.

As shown in FIG. 3(G), a tunnel-shaped cover 86 is provided to surround the transfer path of the preform 1 at a position where the preform 1 having been heated is fed to the die 4. A ceiling portion of the tunnel-shaped cover 86 that covers the mouth portion 2*a* of the preform 1 from above has a shape like a roof having an inclined face. A nozzle 86*a* in the form of a series of pipes or a slit from which the aseptic air Q is blasted to the mouth portion 2*a* of the preform 1 is provided in the ceiling portion. Thus, the aseptic air Q is efficiently supplied to the preform 1, and the aseptic condition of the preform 1 is maintained while the preform 1 is transferred in a chamber 41*b*.

The preform 1 conveyed with the aseptic condition thereof maintained by the blasted aseptic air Q is put in the die 4 as shown in FIG. 3(H).

The die 4 is clamped while continuously traveling at the same speed as the preform 1 transferred and is opened after the blow molding of the preform 1 in the die 4 is completed.

Since the preform 1 excluding the mouth portion 2*a* has been uniformly heated to a temperature range suitable for molding in the heating step shown in FIG. 2(F) as described above, when the heated preform 1 is placed in the die 4, and an extension rod 5 is inserted in the preform 1, the preform 1 is expanded in the lengthwise direction in the die 4.

After that, for example, primary blowing aseptic air and secondary blowing aseptic air are sequentially blasted into the preform 1 from a blow nozzle (not shown), thereby expanding the preform 1 into the bottle 2 as a molded product in a cavity C of the die 4.

Once the bottle 2 is molded in the die 4, the die 4 is opened while continuing traveling, and the bottle 2 as a finished product is removed from the die 4.

After the bottle 2 is removed from the die 4, the bottle 2 is conveyed to a hydrogen peroxide supply step shown in FIG. 4(J) while the aseptic air Q is blasted to the bottle 2 at the side of the mouth portion 2*a* as shown in FIG. 3(I). The blasting of the aseptic air Q minimizes pollution of the bottle 2 by bacteria while the bottle 2 is fed to directly below a sterilizer supplying nozzle 93.

The aseptic air Q shown in FIG. 3(I) is desirably hot air. Blasting of hot air prevents the temperature of the bottle 2 from decreasing, so that the effect of the subsequent sterilization by hydrogen peroxide is improved.

In addition, as shown in FIG. 3(I), a tunnel-shaped cover 87 that surrounds the transfer path of the bottle 2 is provided at a position where the bottle 2 is moved to the sterilizer supplying nozzle 93 for the subsequent step (see FIG. 4(J)). A ceiling portion of the tunnel-shaped cover 87 that covers the mouth portion 2*a* of the bottle 2 from above has a shape like a roof having an inclined face. A nozzle 87*a* in the form of a series of pipes or a slit from which the aseptic air Q is blasted to the mouth portion 2*a* of the bottle 2 or to the transfer path of the bottle 2 is provided in the ceiling portion. Thus, the aseptic air Q is efficiently supplied to the bottle 2, and the aseptic condition of the bottle 2 is maintained while the bottle 2 is transferred in chambers 41*b* and 41*c*1.

The bottle 2 to which the aseptic air Q has been blasted is sterilized by suppling hydrogen peroxide as a sterilizer as shown in FIG. 4(J).

Specifically, a mist M or gas G of hydrogen peroxide or a mixture thereof is blasted to the bottle 2 being conveyed from the sterilizer supplying nozzle 93. The sterilizer supplying nozzle 93 is arranged to be opposed to the mouth portion 2*a* of the bottle 2. The mist M or gas G of hydrogen peroxide or a mixture thereof flows down from a tip end of the sterilizer supplying nozzle 93 and enters the bottle 2 through the mouth portion 2*a* of the bottle 2 to come into contact with the inner surface of the bottle 2.

A tunnel 44 is provided at a position where the bottle 2 is transferred. The mist M or gas G of hydrogen peroxide or a mixture thereof discharged from the sterilizer supplying nozzle 93 flows down along the outer surface of the bottle 2 and is accumulated in the tunnel 44, so that the mist M or gas G of hydrogen peroxide or a mixture thereof is effectively deposited on the outer surface of the bottle 2.

Figure 9:
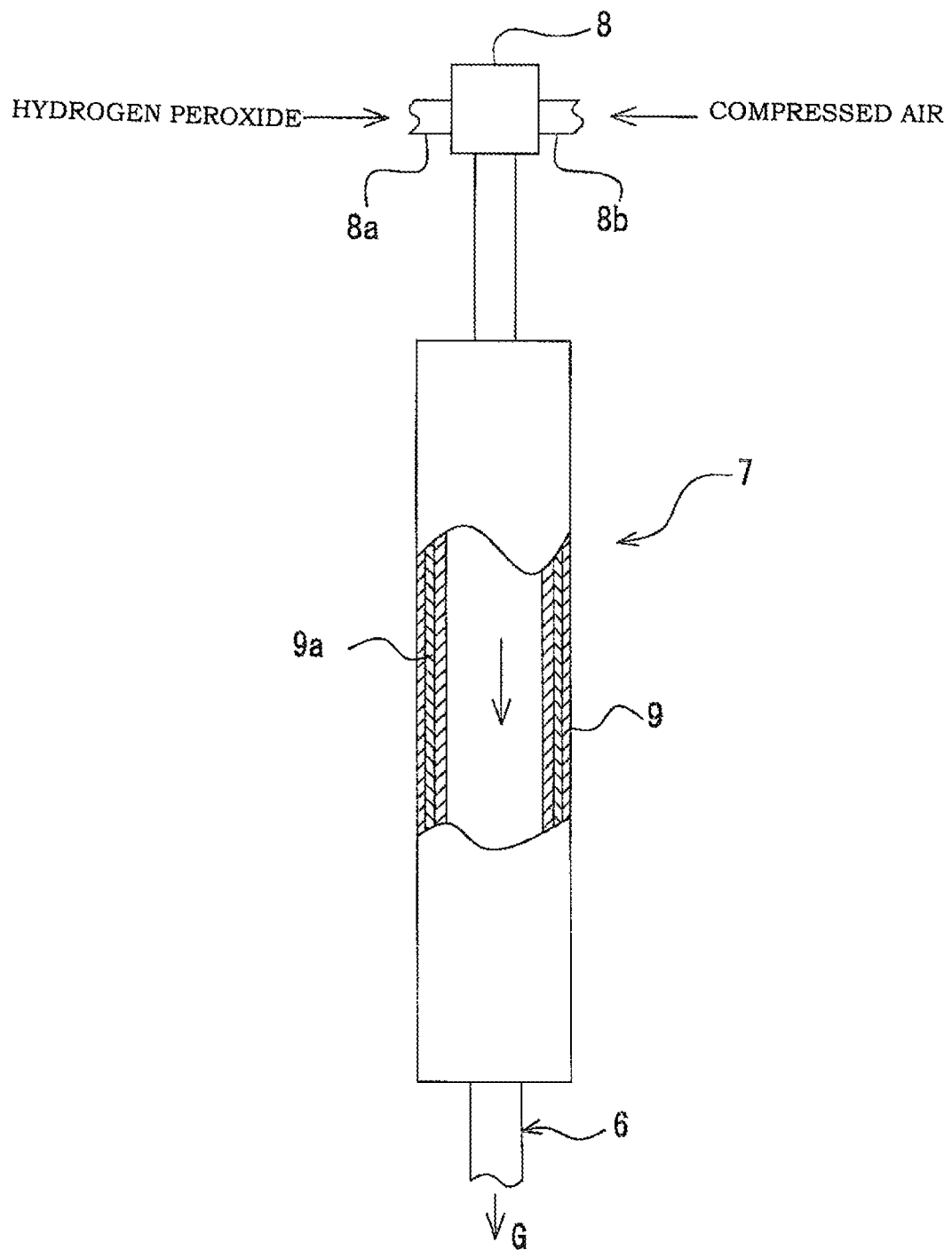
FIG. 9 is a partially cut-way plan view of a sterilizer gas generator.

The mist M or gas G of hydrogen peroxide can be generated by the sterilizer gas generator 7 shown in FIG. 9, for example.

The sterilizer supplying nozzle 93 may be installed at a fixed position on the conveying path of the bottle 2 or may be moved in synchronization with the bottle 2.

As shown in FIG. 4(J), the mist M or gas G of hydrogen peroxide or a mixture thereof blasted from the sterilizer supplying nozzle 93 comes into contact with the inner and outer surfaces of the bottle 2. At this point in time, the bottle 2 is kept at a predetermined temperature by the heat remaining in the bottle 2 after being applied to the preform 1 or to the bottle 2 in the step shown in FIG. 3(I), and therefore is efficiently sterilized.

If the preform 1 is made of PET, the predetermined temperature is desirably 40° C. to 80° C., and more desirably 50° C. to 75° C. If the temperature is lower than 40° C., the sterilization effect significantly deteriorates. If the temperature is higher than 80° C., the bottle disadvantageously shrinks after molding.

After the blasting of the mist N or gas G of hydrogen peroxide or a mixture thereof, the bottle 2 is subjected to air rinsing as shown in FIG. 4(K1). The air rinsing is achieved by blasting aseptic air N into the bottle 2 from an aseptic air supplying nozzle 45, and the flow of the aseptic air N removes foreign matters, hydrogen peroxide or the like from the bottle 2. In this step, the bottle 2 is in the upright position.

An umbrella-shaped member 84 is desirably attached to the aseptic air supplying nozzle 45. The aseptic air N having spilled out of the bottle 2 is guided to the outer surface of the bottle 2 by the guiding effect of the umbrella-shaped member 84, and thus the outer surface of the bottle 2 is air-rinsed.

The air rinsing step shown in FIG. 4(K1) may be replaced with an air rinsing step shown in FIG. 4(K2). If the step shown in FIG. 3(K2) is adopted, that is, if the bottle 2 is inverted and the aseptic air N is blasted into the bottle 2 through the mouth portion 2a facing down, foreign matters or the like that cannot be removed from the preform 1 or enter the bottle 2 during or after molding of the preform 1 into the bottle 2 can be made to fall out of the bottle 2 through the mouth portion 2a.

Alternatively, the air rinsing step shown in FIG. 4(K1) may be followed by the step shown in FIG. 4(K2) that does not involve blasting of the aseptic air N. The umbrella-shaped member 84 may also be attached to the aseptic air supplying nozzle 45 shown in FIG. 4(K2).

After the air rinsing, as required, aseptic water rinsing using aseptic water at room temperature or hot water H at 15° C. to 85° C. may be performed to wash away the hydrogen peroxide deposited on the bottle 2 as shown in FIG. 5(L). The flow rate of the hot water H discharged by each nozzle 46 is 5 L/min to 15 L/min, and the duration of the cleaning rinsing is desirably 0.2 to 10 seconds.

As described above, the bottle 2 is sterilized by hydrogen peroxide after the preform 1 is sterilized, the amount of hydrogen peroxide used to sterilize the bottle 2 is small, so that the hot water rinsing step after the air rinsing can be omitted.

The mist M or gas G of hydrogen peroxide used in the step shown in FIG. 4(J) will be described below.

In terms of the amount of mist M, if a bottle 2 having a volume of 500 mL is sterilized by only the step shown in FIG. 4(J), 50 μL to 100 μL of hydrogen peroxide needs to be deposited on the bottle 2. However, if the preform 1 is sterilized as in the present invention, the bottle having the same volume can be sterilized to a commercially allowable level by depositing 10 μL to 50 μL of hydrogen peroxide mist M on the bottle.

In terms of the amount of gas G, if the bottle 2 is sterilized by only the step shown in FIG. 4(J), a hydrogen peroxide gas G with a concentration of 5 mg/L to 10 mg/L needs to be blasted to the bottle 2. However, if the preliminary sterilization involving the preliminary heating of the preform 1 is performed as in present invention, the bottle can be sterilized to a commercially allowable level by blasting a hydrogen peroxide gas G with a concentration of 1 mg/L to 5 mg/L.

If the aseptic water rinsing is omitted, after the air rinsing, the bottle 2 as an aseptic package is finished by filling the bottle 2 with the drink "a" through a filling nozzle 10 as shown in FIG. 5(M) and sealing the bottle 2 with the cap 3 as a lid as shown in FIG. 5(N).

An aseptic filling apparatus that performs the aseptic filling method described above is configured as shown in FIG. 6, for example.

As shown in FIG. 6, the aseptic filling apparatus includes a preform supplying machine 11 that successively supplies preforms 1 having the shape of a bottomed tube having the mouth portion 2a (see FIG. 1(A)) at predetermined intervals, a blow-molding machine 12, a sterilizing machine 88 that sterilizes the molded bottles 2, and a filling machine 13 that fills the bottles 2 (see FIG. 3(I)) with the drink "a" and seals the same with the caps 3 (see FIG. 5(N)).

Portions of the aseptic filling apparatus from the preform supplying machine 11 to the filling machine 13 are surrounded by chambers 94, 41a, 41b, 41c1, 41c2, 41d, 41e and 41f.

The chamber 94 is located at a position where the preform is introduced into the aseptic filling apparatus, the chamber 41a is located at a position where the sterilizer is supplied to the preform, the chamber 41b is located at a position where the preform is molded into bottle 2, the chamber 41c1 is located at a position where the bottle is conveyed to the sterilizing machine 88, the chamber 41c2 is located at a position where the sterilizer is supplied to the bottle 2 and the bottle 2 is rinsed, and the chamber 41d is located at a position where the bottle 2 is filled with the drink "a" and sealed.

A portion between the chamber 94 and the chamber 41c1 including the chamber 41b is maintained to be a clean room. To provide a clean room, aseptic positive-pressure air having passed through a HEPA filter (not shown) has been supplied into the chambers 94, 41b and 41c1 since before the manufacture of the aseptic package is started. As a result, the interior of the chambers 94, 41b and 41c1 is kept clean, and the bottle can be manufactured with high level of asepsis.

Before the aseptic positive-pressure air is blasted into the chambers 94, 41b and 41c1, the interior of the chambers 41b, 41c and 41c1 may be sterilized by a hydrogen peroxide gas with a concentration of 10 mg/L or less. Alternatively, a portion that comes into contact with the preform 1 or the bottle 2 may be irradiated by an UV lamp (ultraviolet sterilization). Alternatively, the die 4, the extension rod 5, the gripper 32 or other parts with which the material comes into contact may be wiped with a cloth moistened with a chemical agent containing 1 percent by mass of ethanol or hydrogen peroxide. Alternatively, a spray nozzle may be provided in a chamber, and the sterilizer may be automatically sprayed for a predetermined time before production or after replacement of the molding die.

Between the preform supplying machine 11 and the filling machine 13, there are provided a preform conveying device that conveys the preform 1 on a first conveying path, a die conveying device that conveys the die 4 having the cavity C having the shape of the finished bottle 2 (see FIG. 3(H)) on a second conveying path connected to the first conveying path, and a bottle conveying device that conveys the bottle 2 molded in the die 4 on a third conveying path connected to the second conveying path and performs sterilization, filling or the like of the bottle 2.

The first, second and third conveying paths are connected to each other, and a belt conveyor 14, a wheel 15, the gripper 32 and other components for holding and conveying the preform 1 and the bottle 2 are provided on these conveying paths.

The preform conveying device includes the belt conveyor 14 that successively conveys the preforms 1 at predetermined intervals on the first conveying path.

As shown in FIG. 6, the belt conveyor 14 is provided in the chamber 94 to extend from a feed-out portion 11a of the preform supplying machine 11 into the chamber 41a.

The feed-out portion 11a is a device that stores a large number of preforms 1 and feeds the preforms 1 one by one onto a starting end of the belt conveyor 14. The feed-out portion 11a is a well-known device and thus will not be described in detail.

Figure 7:
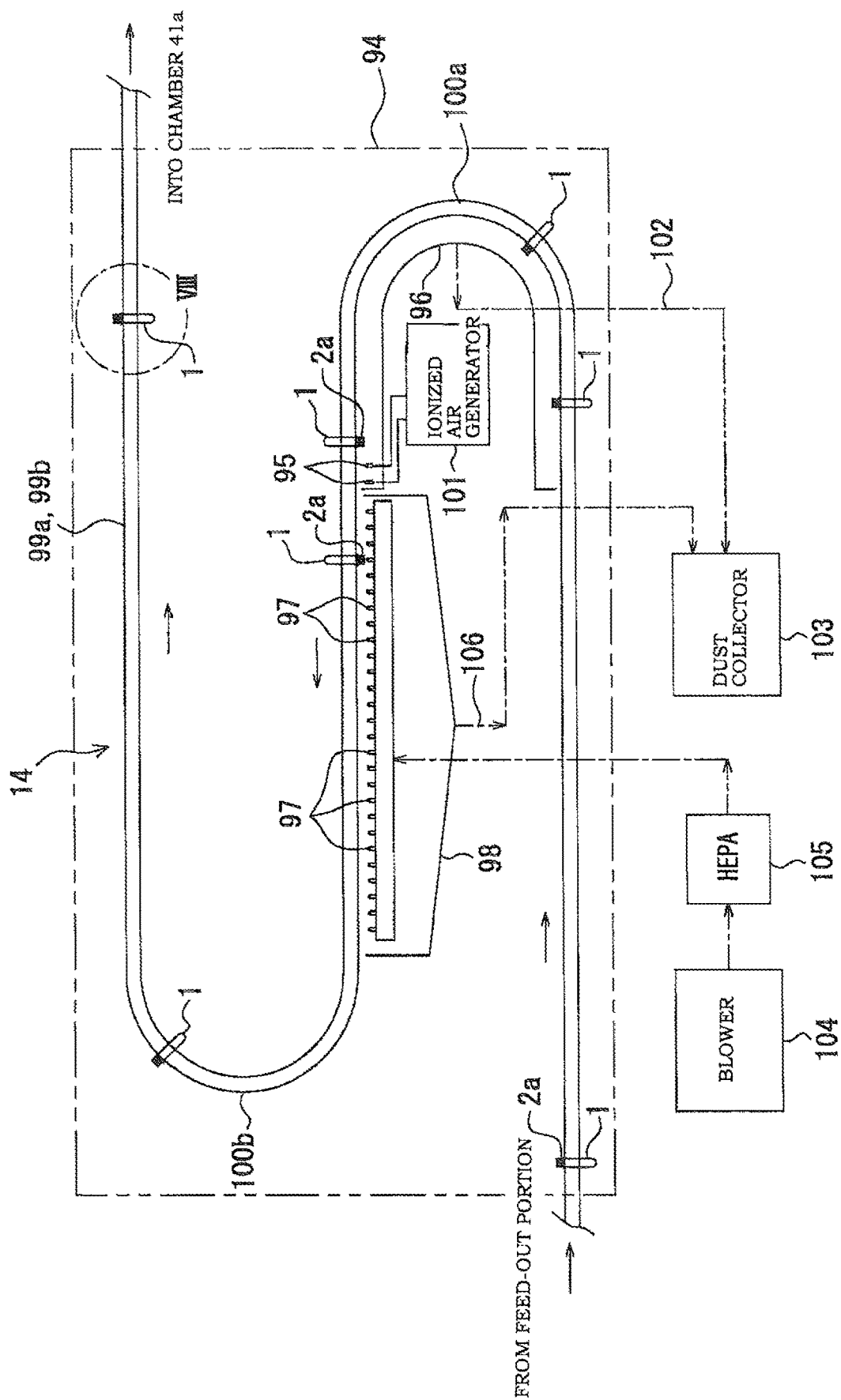
FIG. 7 is a front view schematically showing the apparatus for removing a foreign matter from a preform.
Figure 8:
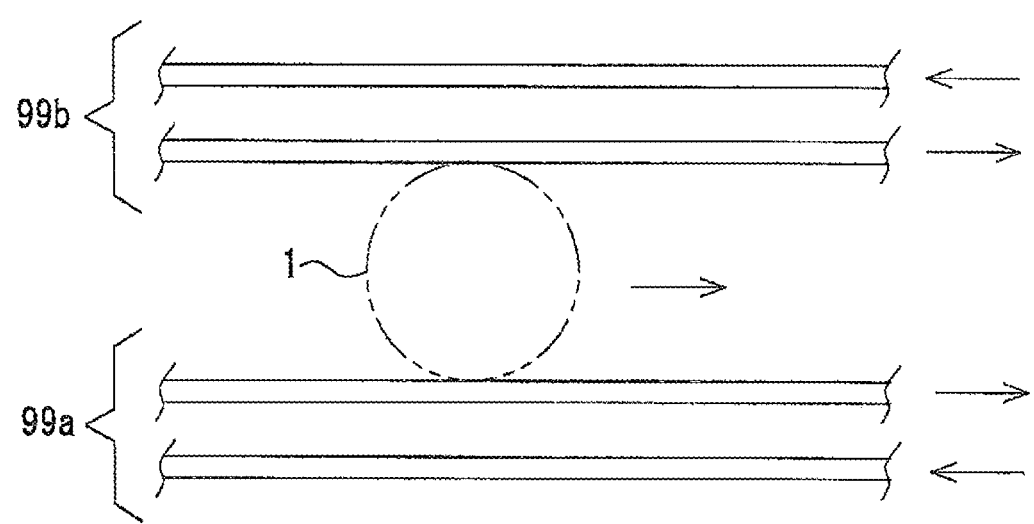
FIG. 8 is a partially cut-away plan view of a part VIII in FIG. 7.

The belt conveyor 14 is bent in a substantially S-shape in the vertical plane as shown in FIG. 7 and includes a pair of endless belts 99a and 99b that extend in parallel with each other in the horizontal direction as shown in FIG. 8.

As shown in FIG. 7, the endless belts 99a and 99b extend along a substantially horizontal straight line between a first bent portion 100a and a second bent portion 100b. Furthermore, the endless belts 99a and 99b extend along a horizontal or inclined straight line between the feed-out portion 11a and the first bent portion 100a and between the second bent portion 100b and the chamber 41a.

As shown in FIG. 8, the pair of endless belts 99a and 99b are arranged in such a manner that the distance between the endless belts traveling in parallel with each other is slightly smaller than the diameter of the preform 1. The pair of endless belts 99a and 99b are driven to travel at the same speed in the opposite direction, so that the preforms 1 are sequentially conveyed at predetermined intervals from the feed-out portion 11a into the chamber 41a.

The pair of endless belts 99a and 99b may be driven at slightly different speeds in the opposite direction. In that case, the preforms 1 rotate on their respective axes while being conveyed from the feed-out portion 11a into the chamber 41a.

Each of the endless belts 99a and 99b has a circular or rectangular cross section and is driven by various kinds of driving rollers (not shown) and guided to follow a fixed traveling path by various guide rollers, guide rails or the like (not shown).

Once the endless belts 99a and 99b are driven, the preforms 1 fed from the feed-out portion 11a travel one by one between the endless belts 99a and 99b as shown in FIGS. 7 and 8. The preform 1 is first transferred in the upright position with the mouth portion 2a facing up between the endless belts 99a and 99b, then transferred in the inverted position with the mouth portion 2a facing down from the first bent portion 100a to the second bent portion 100b of the endless belts 99a and 99b, and then transferred in the chamber 41a in the upright position again after the preform 1 passes through the second bent portion 100b.

As shown in FIG. 7, below the transfer path of the preform 1 between first bent portion 100a and the second bent portion 100b of the endless belts 99a and 99b, the ionized air nozzle 95 and the filtered air nozzle 97 are arranged in this order from an upstream side to a downstream side along the flow of the preform 1.

One or more ionized air nozzles 95 are installed at predetermined position(s) in the chamber 94 in such a manner that the nozzle opening(s) are directly opposed to the mouth portion 2a of the preform 1. An ionized air generator 101 that feeds the ionized air to the ionized air nozzles 95 is installed at a predetermined position in the chamber 94.

When the ionized air nozzle 95 blasts the ionized air to the preform 1 held and transferred in the inverted position by the endless belts 99a and 99b, the ionized air enters the preform 1 through the mouth portion 2a and neutralizes the static electricity on the preform 1. As a result, foreign matters such as dust or plastic pieces that can exist in the preform 1 are made more likely to fall out of the preform 1.

In addition, the suction port member 96 having a chute-like shape is arranged in the chamber 94 to surround the ionized air nozzle 95. The suction port member 96 connected to a dust collector 103 via a suction pipe 102.

Once the dust collector 103 is driven, an air flow occurs at the opening of the suction port member 96, and foreign matters falling out of the preform 1 under their own weight after the static electricity is eliminated ride on the air flow and are sucked into the suction port member 96 from the preform 1 in inverted position. The air flow reaches the dust collector 103 through the suction pipe 102, and the dust collector 103 traps the foreign matters in the air flow.

The suction port member 96 having a chute-like shape desirably extends from the first bent portion 100a of the endless belts 99a and 99b on the upstream side of the flow of the preform 1 to a position directly below the ionized air nozzle 95. In that case, even if a foreign matter is not trapped by the suction port member 96 and falls toward another preform 1 in the upright position transferred below the relevant preform 1, the foreign matter can be prevented from entering the other preform 1.

One or more filtered air nozzles 97 are installed at predetermined position(s) in the chamber 94 in such a manner that the nozzle opening(s) are directly opposed to the mouth portion 2a of the preform 1. A blower 104 and an air filter 105 for feeding filtered air to filtered air nozzle 97 are installed at predetermined positions outside the chamber 94. The air filter 105 may be a HEPA (High Efficiency Particulate Air) filter, and the air P2 supplied to the air nozzle 97 may not be the air from the blower 104 but may be compressed air, which has higher impelling force, from which bacteria is eliminated by an aseptic filter.

When the filtered air nozzle 97 blasts the filtered air to the preform 1 in the inverted position held and transferred by the endless belts 99a and 99b, the filtered air enters the preform 1 through the mouth portion 2a, traps foreign matters and flows out of the preform 1. Since static electricity on the preform 1 and the foreign matters has been eliminated by the blasting of the ionized air, the foreign matters are easily trapped by the filtered air.

Furthermore, the suction port member 98 having a chute-like shape is arranged in the chamber 94 to surround the filtered air nozzle 97. The suction port member 98 is connected to the dust collector 103 via a suction pipe 106. The suction port member 98 may be integrated with the suction port member 96 on the upstream side. A single pipe may double as the suction pipe 106 and the suction pipe 102.

Once the dust collector 103 is driven, an air flow occurs in the vicinity of the opening of the suction port member 98, and foreign matters ride on the air flow and flow out of the preform 1 in the inverted position into the suction port member 98. The air flow including the foreign matters reaches the dust collector 103 through the suction pipe 106, and the dust collector 103 traps the foreign matters in the air flow.

The suction port member 98 having a chute-like shape desirably has a lower part having a funnel-like shape. This facilitates the air flow including foreign matters into the suction pipe 106 and trapping of the foreign matters.

The suction port member 96 provided for the ionized air nozzle 95 may be extended to a position directly below the suction port member 98 provided for filtered air nozzle 97. In that case, even if a foreign matter is not trapped by the suction port member 98 and falls toward another preform 1 in the upright position transferred below the relevant preform 1, the foreign matter can be prevented from entering the other preform 1.

The preform 1 conveyed by the endless belts 99a and 99b and cleaned by the filtered air removing foreign matters from the interior thereof restored to the upright position when the preform 1 reaches the straight portion of the endless belts 99a and 99b after passing through the second bent portion 100b, and conveyed in the upright position into the chamber 41a.

As shown in FIG. 6, the first conveying path of the preform conveying device includes not only the belt conveyor 14 described above but also a train of wheels 15, 16 and 17 that receives the preforms 1 from the terminal end of the belt conveyor 14 and conveys the preforms 1, and an endless chain 18 that receives and transfers the preforms 1.

The sterilizer gas generator 7 shown in FIG. 9 that generates the hydrogen peroxide gas G and the sterilizer supplying nozzle 6 shown in FIG. 2(D) that discharges the hydrogen peroxide gas G to the preform 1 are arranged at predetermined positions on the transfer path of the preform 1 at the wheel 15.

As shown in FIG. 9, the sterilizer gas generator 7 includes a hydrogen peroxide supplying portion 8 that is a twin-fluid spray nozzle that supplies a hydrogen peroxide solution serving as a sterilizer in the form of drops and an evaporating portion 9 that evaporates a spray of hydrogen peroxide supplied from the hydrogen peroxide supplying portion 8 by heating the spray of hydrogen peroxide to a temperature equal to or higher than the boiling point thereof and equal to or lower than the non-degradable temperature thereof. The hydrogen peroxide supplying portion 8 is configured to receive the hydrogen peroxide solution and compressed air from a hydrogen peroxide supply path 8a and a compressed air supply path 8b, respectively, and sprays the hydrogen peroxide solution into the evaporating portion 9. The evaporating portion 9 is a pipe that incorporates a heater 9a disposed between inner and outer walls thereof, and heats and evaporates the spray of hydrogen peroxide blasted into the pipe. The gas of the evaporated hydrogen peroxide is injected from the sterilizer supplying nozzle 6 to the outside of the evaporating portion 9.

The air nozzle 80 (see FIG. 2(E)) that discharges the hot air P to the preform 1 to activate the hydrogen peroxide deposited on the inner and outer surfaces of the preform 1 and discharge the hydrogen peroxide from the preform 1 is arranged on the transfer path of the preform 1 at the wheel 16.

Figure 10A:
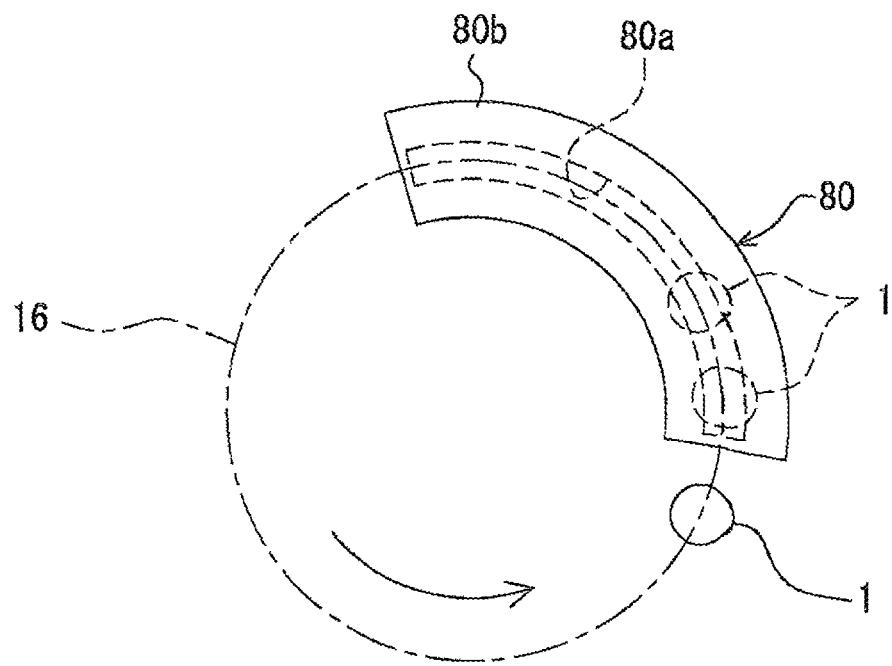
FIG. 10(A) is a plan view.
Figure 10B:
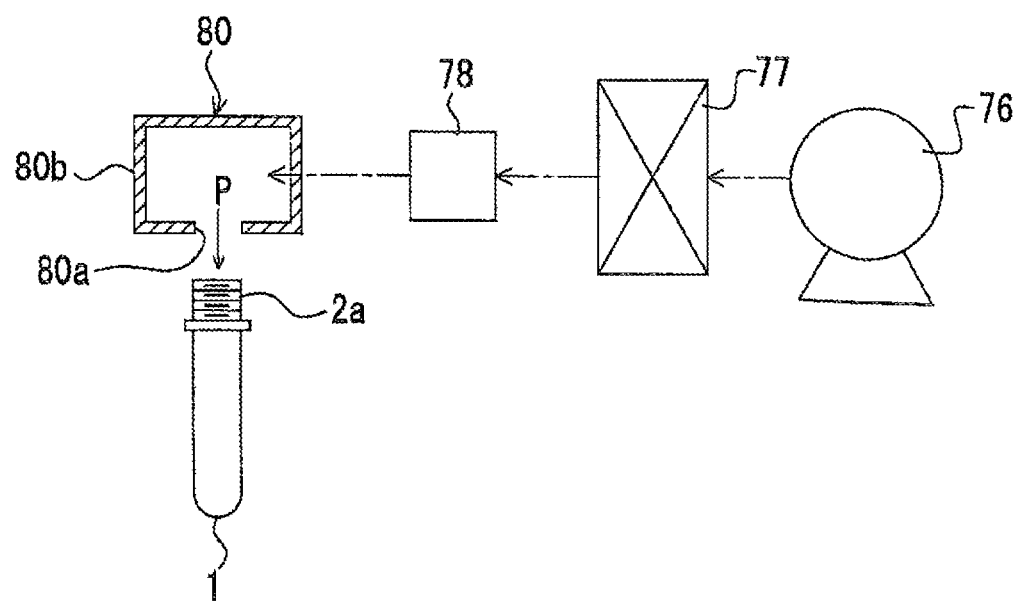
FIG. 10(B) is a vertical cross-sectional view.

As shown in FIG. 10(A), the air nozzle 80 has a box-shaped manifold 80b that is curved along the arc of wheel 16 and a slit-shaped blasting port 80a formed in a bottom surface of the manifold 80b. The air nozzle 80 is arranged above the wheel 16 in such a manner that the blasting port 80a extends along the transfer path of the preform 1 at the wheel 16. As shown in FIG. 10(B), a blower 76, a HEPA filter 77 and an electric heater 78 are connected to the manifold 80b. The blower 76 takes outside air in, the HEPA filter 77 eliminates bacteria from the outside air, the electric heater 78 heats the outside air, and the resulting hot air P is fed to the air nozzle 80.

The air supplied to the air nozzle 80 may not be the air from the blower 76 but may be compressed air, which has higher impelling force, from which bacteria is eliminated by an aseptic filter. Alternatively, high-pressure air used for blow molding in the blow molding machine 12 may be recycled and reused.

The hot air P supplied into the manifold 80b of the air nozzle 80 is injected from the blasting port 80a and flows to the preform 1 transferred with the mouth portion 2a facing up below the blasting port 80a. Part of the hot air P flows into the cavity of the preform 1, and the other flows along the outer surface of the preform 1.

The heat of the hot air P activates the hydrogen peroxide deposited on the inner and outer surfaces of the preform 1, and the activated hydrogen peroxide sterilizes bacteria on the preform. The flow of the hot air P removes an excess of the hydrogen peroxide from the preform 1 and prevents hydrogen peroxide from being introduced into an adjacent heating furnace 33.

As shown in FIG. 6, the wheels 15 and 16 are surrounded by the chamber 41a. An exhaust device including a filter 36 that decomposes the sterilizer such as hydrogen peroxide in the air in the chamber 41a and a blower 37 is connected to the chamber 41a. Thus, hydrogen peroxide can be prevented from flowing into the adjacent blow molding machine 12.

On the first conveying path, the heating furnace 33 that heats the preform 1 to a molding temperature is provided at a position between the wheel 17 adjacent to the wheel 16 and the wheel 19 adjacent to the second conveying path.

The heating furnace 33 has a furnace chamber extending in one direction. In the furnace chamber, the endless chain 18 is stretched between a pair of pulleys 34a and 34b opposed to each other in the horizontal plane. The endless chain 18 and associated members constitute a conveyor that conveys a large number of preforms 1 suspended therefrom. Infrared heaters 18a are attached to the inner wall surface of the furnace chamber along a first leg and a second leg of the endless chain 18.

Once the spindle 43 (see FIG. 2(F)) receives the preform 1 having been conveyed by the preform conveyer 14 and the train of wheels 15, 16 and 17, the preform 1 travels along the inner wall surface of the heating furnace 33 while rotating on its axis. The infrared heaters 18a are provided all over the inner wall surface of the heating furnace 33, and the preform 1 conveyed by the spindle 43 is heated by the infrared heaters 18a. The preform 1 rotates on its axis with the spindle 43 while the preform 1 travels in the heating furnace 33 and is uniformly heated by the infrared heaters 18a, and the temperature of the preform 1 excluding the mouth portion 2a rises to a temperature between 90° and 130° C. that is suitable for blow molding. The mouth portion 2a is kept at a temperature equal to or lower than 70° C. at which no deformation or the like occurs, in order to avoid compromising the sealing of the mouth portion 2a with the cap 3.

The blow molding machine 12 is arranged around the second conveying path. The blow molding machine 12 includes a plurality of sets of die 4 and extension rod 5 (see FIG. 3(H)) that receive the preforms 1 heated by the infrared heaters 18a in the preform supplying machine 11 described above and mold the preforms 1 into the bottles 2.

The tunnel-shaped cover 86 (see FIG. 3(G)) is provided above the wheel 19 located between the first conveying path of the preform conveying device and the second conveying path of the die conveying device to cover the mouth portion 2a of the preform 1 transferred around the wheel 19 from above. The aseptic air Q is blasted into the cover 86 toward the mouth portion 2a of the preform 1. The aseptic air Q may be part of the aseptic air P supplied from an aseptic air supplying apparatus shown in FIG. 10(B).

In this way, the preform 1 is surrounded by the chamber 41b constituting the clean room and is further covered by the cover 86 containing the aseptic air Q. Thus, preform 1 is fed to the blow molding machine 12 in a highly aseptic condition.

In the blow molding machine 12, a plurality of dies 4 are arranged around the wheel 20 at predetermined intervals. The die 4 receives the preform 1 from around the wheel 19 and molds the preform 1 into the bottle 2, is opened when the die 4 reaches a wheel 21 at the starting end of the third conveying path, and passes the bottle 2 to the gripper 32 around the wheel 21.

The bottle 2 having exited the blow-molding machine 12 and reached the wheel 21 is inspected by an inspection apparatus 35 arranged around the wheel 21 to determine whether the molding is defective or not. The inspection apparatus 35 can be the same as that used in the first embodiment.

If the inspected bottle 2 is defective, the bottle 2 is removed from the conveying path by a removing apparatus (not shown). Only the bottles 2 that are not determined to be defective are conveyed to a wheel 22.

On the third conveying path, the tunnel-shaped cover 87 (see FIG. 3(I)) that covers the mouth portion 2*a* of the bottle 2 from above is provided above the transfer path of the bottle 2 at the wheels 21, 22 and 89. The aseptic air Q blasted into the cover 87 may be part of the aseptic air P supplied from the aseptic air supplying apparatus shown in FIG. 10(B).

On the third conveying path, the sterilizer supplying nozzle 93 (see FIG. 4(J)) and the aseptic air supplying nozzle 45 (see FIG. 4(K1)) or 4(K2)) are provided for a train of wheels 90, 91, 92 and 23 that follows the wheel 89 described above.

Specifically, a plurality of sterilizer supplying nozzles 93 are installed at fixed positions on the transfer path of the bottle 2 around the wheel 90 (four sterilizer supplying nozzles are shown in FIG. 6). The tunnel 44 (see FIG. 4(J)) through which the bottle 2 passes is installed at a position corresponding to the sterilizer supplying nozzles 93. The mist M or gas G of hydrogen peroxide or a mixture thereof blasted from the sterilizer supplying nozzle 93 enters the bottle 2, and is deposited on the inner surface of the bottle 2 in the form of a thin film or flows along the outer surface of the bottle 2 to fill the tunnel 44 and is deposited on the outer surface of the bottle 2 in the form of a thin film.

One or more aseptic air supplying nozzles 45 are installed at fixed positions on the transfer path of the bottle 2 around the wheel 92. The aseptic air N blasted from the aseptic air supplying nozzle 45 comes into contact with the inner and outer surfaces of the bottle 2 and removes an excess of the hydrogen peroxide film from the surface of the bottle 2. If the aseptic air N is hot air, the aseptic air N activates the hydrogen peroxide on inner and outer surfaces of the bottle 2 to improve the sterilization effect.

A large number of sterilizer supplying nozzles 93 and a large number of aseptic air supplying nozzles 45 may be arranged around the wheels 90 and 92, respectively, at the same intervals as the bottles 2, and the hydrogen peroxide gas G and the aseptic air N may be blasted into the bottles 2 while rotating the sterilizer supplying nozzles 93 and the aseptic air supplying nozzles 45 in synchronization with the wheels 90 and 92, respectively.

On the third conveying path, a filler 39 and a capper 40 are provided for a train of wheels 24, 25, 26 and 27 that is adjacent to the wheel 23.

Specifically, a large number of filling nozzles 10 (see FIG. 5(M)) that fill the bottles 2 with the drink "a" are arranged around the wheel 24 to form the filler 39, and the capper 40 that attaches the cap 3 (see FIG. 5(N)) to each bottle 2 filled with the drink "a" to seal the bottle 2 is formed around the wheel 26.

The filler 39 and the capper 40 have well-known structures and thus will not be described herein.

On the first to third conveying paths, the wheel 15 and its periphery are surrounded by the chamber 41*a*. The portion between the wheel 16 and the wheel 21 and its periphery are surrounded by the chamber 41*b*. The wheels 22 and 89 and their periphery are surrounded by the chamber 41*c*1. The portion between the wheel 90 and the wheel 23 and its periphery are surrounded by the chamber 41*c*2. The portion between the wheel 24 and the wheel 27 and its periphery are surrounded by the chamber 41*d*.

Aseptic air cleaned through a HEPA filter (not shown) is constantly supplied into the chamber 41*b*. As a result, the chamber 41*b* is a clean room, and entry of bacteria into the chamber 41*b* is prevented.

The interiors of the chambers 41*a*, 41*b*, 41*c*2, 41*d*, 41*e* and 41*f* are sterilized by performing COP (cleaning outside of place) or SOP (sterilizing outside of place), for example, and then the gas or mist of the sterilizer or cleaner is discharged from the chambers 41*a*, 41*b*, 41*c*2, 41*d*, 41*e* and 41*f* by the same exhaust device as that shown in FIG. 3. The exhaust device may be provided as a separate device for each of the chambers 41*a*, 41*b*, 41*c*2, 41*d*, 41*e* and 41*f* or as a single device for all the chambers 41*a*, 41*b*, 41*c*2, 41*d*, 41*e* and 41*f*. The aseptic condition of the interiors of the chambers 41*a*, 41*b*, 41*c*2, 41*d*, 41*e* and 41*f* is maintained by supplying aseptic air cleaned by a scrubber, a filter or the like (not shown) into the chambers 41*a*, 41*b*, 41*c*2, 41*d*, 41*e* and 41*f*. Although the chambers 41*d*, 41*e* and 41*f* always need to be subjected to COP or SOP, the chambers 41*a*, 41*b* and 41*c*2 do not always have to be subjected to COP or SOP.

The chamber 41*c*1 serves as an atmosphere separating chamber that separates the atmosphere in the chamber 41*b* and the atmosphere in the chamber 41*c*2. The same exhaust device as the exhaust device described above is connected to the chamber 41*c*1 to discharge the internal air of the chamber 41*c*1 to the outside. Thus, a gas of the cleaner or the like that originates from COP or SOP in the chamber 41*d* or a mist of the sterilizer or the like that is produced in the chamber 41*c*2 can be prevented from flowing into the chamber 41*b* of the blow molding machine 12 through the chamber 41*c*1.

Next, with reference to FIGS. 1 to 11, an operation of the apparatus for removing a foreign matter from a preform and an operation of the aseptic filling apparatus will be described.

First, the preform supplying machine 11 is driven, and the preforms 1 in the upright position with the mouth portions 2*a* facing up are successively fed out from the feed-out portion 11*a*. Once the fed-out preforms 1 reach the traveling belt conveyor 14, the preforms 1 are held between the endless belts 99*a* and 99*b* and transferred one by one, as shown in FIGS. 7 and 8.

Although the preform 1 held between the endless belts 99*a* and 99*b* is first transferred in the upright position with the mouth portion 2*a* facing up, the preform 1 is transferred in the inverted position with the mouth portion 2*a* facing down on the straight transfer path between the first bent portion 100*a* and the second bent portion 100*b* of the endless belts 99*a* and 99*b*.

As shown in FIG. 7, when the preform 1 is transferred between the first bent portion 100*a* and the second bent portion 100*b* of the endless belts 99*a* and 99*b*, the preform 1 is in the inverted position, and the ionized air is blasted from the ionized air nozzle 95 to the preform 1 in the inverted position (see FIG. 1(A)). The ionized air enters the preform 1 through the mouth portion 2*a* and neutralizes the static electricity in the preform 1, thereby making foreign matters such as dust or plastic pieces that can exist in the preform 1 more easy to fail out of the preform 1.

The preform 1 continues being transferred in the inverted position after passing by the ionized air nozzle 95, and the filtered air is blasted to the preform 1 from the filtered air nozzle 97 (see FIG. 1(B)).

When the filtered air is blasted from the filtered air nozzle 97 to the preform 1 that is held between the endless belts 99*a* and 99*b* and transferred in the inverted position, the filtered air enters the preform 1 through the mouth portion 2*a*, traps foreign matters and flows out of the preform 1. Since the static electricity has been eliminated from the preform 1 and the foreign matters by the blasting of the ionized air described above, the foreign matters are easily trapped by the filtered air.

The dust collector 103 is driven when the preform supplying machine 11 is driven. Once the dust collector 103 is driven, an air flow occurs in the vicinity of the opening of the suction port member 98, and foreign matters ride on the air flow and flow out of the preform 1 in the inverted position into the suction port member 98. The air flow including the foreign matters reaches dust collector 103 through the suction pipe 106, and the dust collector 103 traps the foreign matters in the air flow.

After the interior of the preform 1 is cleaned by removing foreign matters, the preform 1 continues being conveyed by the endless belts 99a and 99b. When the preform 1 reaches the straight portion after passing through the second bent portion 100b of the endless belts 99a and 99b, the preform is restored to the upright position (see FIG. 1(C)) and conveyed in the upright position into the chamber 41a.

Once the preform 1 enters the chamber 41a, the preform 1 is received by the gripper 32 around the wheel 15. When the preform 1 is transferred around the wheel 15, the gas G or mist of hydrogen peroxide or a mixture thereof is supplied to the preform 1 from the sterilizer supplying nozzle 6 (see FIG. 2(D)).

The preform 1 on which the hydrogen peroxide is deposited is then transferred around the wheel 16, and meanwhile the hot air P is blasted to the preform 1 from the air nozzle 80. The heat of the blasted hot air P activates the hydrogen peroxide deposited on the surface of the preform 1, and the activated hydrogen peroxide kills bacteria on the preform 1. In addition, the hot air P removes an excess of the hydrogen peroxide from the surface of the preform 1.

After that, the preform 1 is received by the spindle 43 (see FIG. 2(F)) on the endless chain 18 and conveyed into the heating furnace 33.

In the heating furnace 33, the preform 1 is uniformly heated by the infrared heaters 18a until the temperature of the preform 1 excluding the mouth portion 2a rises to a temperature range suitable for blow molding.

When the preform 1 heated to the molding temperature in the heating furnace 33 is transferred around the wheel 19, the preform 1 passes through the cover 86, and the aseptic air Q is blasted to the preform 1 (see FIG. 3(G)). In this way, the preform 1 is conveyed to the blow molding machine 12 with the aseptic condition thereof being maintained. If the aseptic air Q is hot air, the temperature of the preform 1 suitable for molding is advantageously maintained until the preform 1 reaches the blow molding machine 12.

When the preform 1 is transferred around the wheel 20, the preform 1 is placed in the die 4 as shown in FIG. 3(H), and high-pressure aseptic air is blasted into the preform 1 to expand the preform 1 into the bottle 2 as a finished product in the cavity C.

After the die 4 is opened, the molded bottle 2 is removed from the die 4 by the gripper 32 around the wheel 21 and is inspected to determine whether the molding is defective or not by the inspection apparatus 35.

Any defective bottle 2 is removed out of the train by the removing apparatus (not shown), and only the non-defective bottles 2 are passed to the wheel 22 and conveyed to the sterilizing machine 88.

When the bottle 2 is transferred from the wheel 21 to the wheel 89, the bottle 2 passes through the cover 87, and the aseptic air Q is blasted to the bottle 2 (see FIG. 3(I)). In this way, the bottle 2 is conveyed to the sterilizing machine 88 with the aseptic condition thereof being maintained. If the aseptic air Q is hot air, the temperature of the bottle 2 suitable for sterilization is advantageously maintained until the bottle 2 reaches the sterilizing machine 88.

The bottle 2 is transferred around the wheel 90 in the sterilizing machine 88 and is sterilized by blasting the mist M or gas G of hydrogen peroxide or a mixture thereof to the bottle 2 as shown in FIG. 4(J). After that, the bottle 2 is transferred around the wheel 92 and subjected to air rinsing that involves blasting aseptic air N to the bottle 2 as shown in FIG. 4(K1) or 4(K2).

In short, after the air rinsing, the bottle 2 is subjected to hot water rinsing (see FIG. 5(L)).

After that, the bottle 2 reaches the filling machine 13. In the filling machine 13, the bottle 2 is filled with the drink "a", which is a content sterilized in advance, from the filling nozzle 10 of the filler 39 as shown in FIG. 5(M).

The bottle 2 filled with the drink "a" is sealed with the cap 3 by the capper 40 (see FIG. 5(N)) and discharged from the aseptic filling apparatus through an outlet of the chamber 41d.

EXAMPLE

Figure 12:
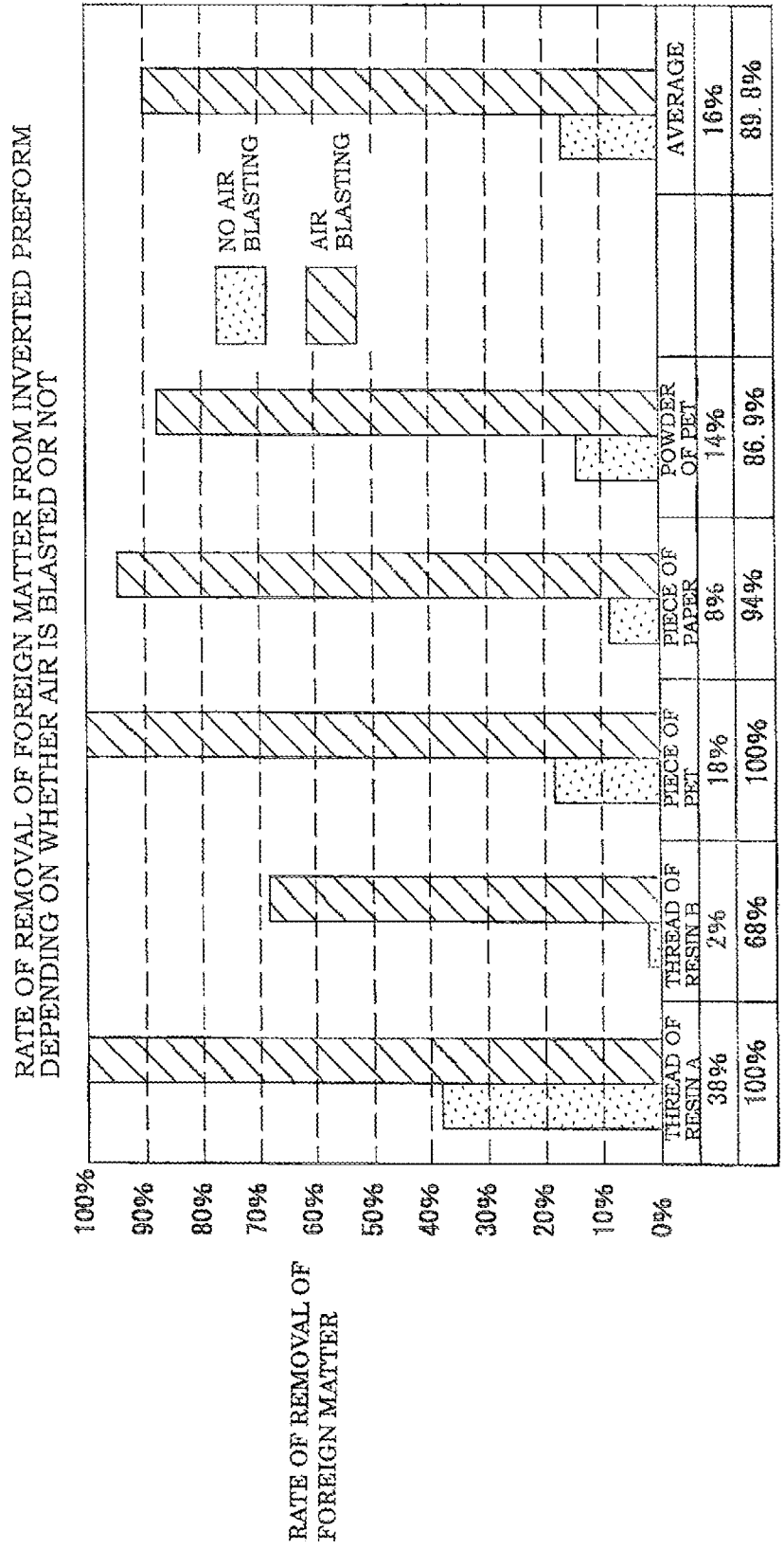
FIG. 12 is a graph showing the rate of removal of foreign matters depending on whether or not air is blasted into the inverted preform.

A preform containing various kinds of foreign matters was kept in the inverted position, and the rate of removal of the foreign matters from the preform was examined for cases where air is blasted into the preform and where no air is blasted into the preform. FIG. 12 shows the result.

The foreign matters used were threads of resin A (having a diameter of 0.52 mm and a length of 5 mm), threads of resin B (having a diameter of 0.148 mm and a length of 5 mm), pieces of PET (having a thickness of 0.1 mm, a length of 5 mm and a width of 5 mm), pieces of paper (having a thickness of 0.08 mm, a length of 5 mm and a width of 5 mm), and powder of PET (having a mass of 0.02 g).

Five preforms were prepared for each of these foreign matters. 10 threads of resin A, 10 threads of resin B, 10 pieces of PET, 10 pieces of paper and 0.02 g of powder of PET were put in the respective preforms.

The preforms were put in the inverted position to let the foreign matters fall out of the respective preforms, and the rate of removal was determined. After that, after the ionized air was blasted into the preforms, the filtered air was then blasted into the preforms to remove the foreign matters from the preforms, and the rate of removal was determined.

The rate of removal (2) was determined according to the following formula.

(amount of removal/amount of input)×100

As is obvious from the result shown in FIG. 12, the rate of removal of foreign matters is markedly improved by inverting the preform and blasting air into the preform.

REFERENCE NUMERAL

1 preform
2 bottle
2a mouth portion
95 ionized air nozzle
96 suction port member
97 filtered air nozzle
98 suction port member
99a, 99b endless belt (conveying device)

The invention claimed is:
1. A method of removing a foreign matter from a preform, comprising:
  transferring the preform continuously in a chamber by having the preform travel individually between a pair of endless belts bent in a substantially S-shape in a vertical plane, the endless belts extending from a lower side to an upper side of the chamber along a flow direction of the preform, the preform being transferred from the lower side to the upper side of the chamber, with the preform being initially transferred in an upright position with a mouth portion thereof facing up, the preform being inverted, and then transferred in an inverted position with the mouth portion thereof facing down from a first bent portion to a second bent portion of the endless belts, blasting filtered air into the preform from a filtered air nozzle through an opening in the mouth portion of the preform, the filtered air nozzle having an inner diameter of 3 mm to 6 mm and a distance between the filtered air nozzle opening and the opening in the mouth portion of the preform being equal to or less than 10 mm, as the preform is being transferred in the inverted position with the mouth portion thereof facing down, at the same time, sucking air from sides of the mouth portion of the preform, the suction of the air being achieved through an opening of a suction port member having a chute-like shape, the suction port member having sides extending between the first bent portion and the second bent portion, and having a lower part that has a funnel-like shape arranged to surround the filtered air nozzle, such that uppermost edges of the side of the section port member, which extend between the first bent portion and the second bent portion, are positioned above both the filtered air nozzle opening and the opening in the mouth portion of the preform, and transferring the perform in the chamber in the upright position again after the preform passes through the second bent portion.

2. The method of removing a foreign matter from a preform according to claim 1, wherein ionized air is blasted into the preform before the filtered air is blasted into the preform.

3. The method of removing a foreign matter from a preform according to claim 2, wherein the ionized air is blasted into the preform from an ionized air nozzle, and air is sucked through a suction port member having a chute-like shape arranged to surround the ionized air nozzle.

4. An apparatus for removing a foreign matter from a preform, comprising:

a conveying device that continuously transfers the preform in a chamber by having the preform travel individually between a pair of endless belts bent in a substantially S-shape in a vertical plane, the endless belts extending from a lower side to an upper side of the chamber along a flow direction of the preform, the preform being transferred from the lower side to the upper side of the chamber, with the preform being transferred initially in an upright position with a mouth portion thereof facing up, the preform being inverted, and then transferred in an inverted position with the mouth portion thereof facing down from a first bent portion to a second bent portion of the endless belts, a filtered air nozzle that blasts filtered air into the preform through an opening in the mouth portion of the preform, the filtered air nozzle having an inner diameter of 3 mm to 6 mm and a distance between the filtered air nozzle opening and the opening in the mouth portion of the preform being equal to or less than 10 mm, as the preform is being transferred in the inverted position with the mouth portion thereof facing down, a suction port member that sucks air from sides of the mouth portion of the preform as the preform is being transferred, an opening of the suction port member having a chute-like shape, the suction port member having sides extending between the first bent portion and the second bent portion, and having a lower part that has a funnel-like shape arranged to surround the filtered air nozzle, such that uppermost edges of the sides of the suction port member, which extend between the first bent portion and the second bent portion, are positioned above both the filtered opening and the opening in the mouth portion of the preform, and the conveying device that transfers the perform in the chamber in the upright position again after the preform passes through the second bent portion.

5. The apparatus for removing a foreign matter from a preform according to claim 4, wherein an ionized air nozzle that blasts ionized air into the preform being transferred in the inverted position is arranged on an upstream side of the filtered air nozzle.

6. The apparatus for removing a foreign matter from a preform according to claim 5, wherein a suction port member having a chute-like shape is arranged to surround the ionized air nozzle.

* * * * *